United States Patent
Spencer et al.

(10) Patent No.: US 9,894,423 B1
(45) Date of Patent: Feb. 13, 2018

(54) VIDEO ADVERTISEMENT CUSTOMIZATION BY COMPOSITING

(71) Applicant: Amazon Technologies, Inc., Reno, NV (US)

(72) Inventors: Simon Lloyd Spencer, Scotland (GB);
Brian Fergus Burns, Scotland (GB);
Reginald Jassal, Scotland (GB);
Martin Christopher Hare Robertson, Scotland (GB); Alistair Francis Smith, Scotland (GB); David Neil Turner, Scotland (GB); Guy Adam Taylor, Scotland (GB)

(73) Assignee: AMAZON TECHNOLOGIES, INC., Reno, NV (US)

( * ) Notice: Subject to any disclaimer, the term of this patent is extended or adjusted under 35 U.S.C. 154(b) by 44 days.

(21) Appl. No.: 14/220,965

(22) Filed: Mar. 20, 2014

(51) Int. Cl.
| | |
|---|---|
| H04N 21/81 | (2011.01) |
| H04N 21/234 | (2011.01) |
| H04N 21/431 | (2011.01) |
| H04N 21/258 | (2011.01) |
| G06Q 30/02 | (2012.01) |
| H04N 21/458 | (2011.01) |

(52) U.S. Cl.
CPC ....... *H04N 21/812* (2013.01); *G06Q 30/0251* (2013.01); *G06Q 30/0276* (2013.01); *H04N 21/23424* (2013.01); *H04N 21/258* (2013.01); *H04N 21/25808* (2013.01); *H04N 21/25866* (2013.01); *H04N 21/4316* (2013.01); *H04N 21/458* (2013.01)

(58) Field of Classification Search
CPC .......... H04N 21/23424; H04N 21/258; H04N 21/25808; H04N 21/25866; H04N 21/4316; H04N 21/458; H04N 21/812
USPC ...................................... 725/32–36
See application file for complete search history.

(56) References Cited

U.S. PATENT DOCUMENTS

| | | | | |
|---|---|---|---|---|
| 6,020,931 | A * | 2/2000 | Bilbrey et al. ................ 348/584 |
| 7,904,922 | B1 * | 3/2011 | Haberman et al. ............ 725/35 |
| 8,495,675 | B1 * | 7/2013 | Philpott et al. ................ 725/34 |
| 2005/0268229 | A1 * | 12/2005 | Wessling ............... G06F 17/248 715/275 |
| 2006/0206807 | A1 * | 9/2006 | Rosner .................. G06F 17/248 715/234 |
| 2007/0132780 | A1 * | 6/2007 | Garbow ........... H04N 21/23412 345/619 |
| 2008/0184288 | A1 * | 7/2008 | Lipscomb ...................... 725/32 |

(Continued)

*Primary Examiner* — Jeremy Duffield
(74) *Attorney, Agent, or Firm* — Eversheds Sutherland (US) LLP

(57) ABSTRACT

Systems and methods are disclosed for providing composite content, such as video content, by compositing. A template content may be received and may have one or more color blocks. One or more drop-in content sets may each have one or more drop-in content that correspond to the one or more colors of the template content color blocks. The one or more color blocks of the template content may be replaced with its corresponding drop-in content from one of the one or more drop-in content sets to generate a composite content. Furthermore, the composite content may have demographic, geographic, and/or behavioral parameters associated with it to enable targeting the composite content, such as in the form of advertisements and/or product or service recommendations, to one or more users.

14 Claims, 7 Drawing Sheets

(56) References Cited

U.S. PATENT DOCUMENTS

| | | | |
|---|---|---|---|
| 2008/0250449 A1* | 10/2008 | Torkos | H04N 21/23412 725/34 |
| 2012/0209714 A1* | 8/2012 | Douglas | G06Q 30/02 705/14.58 |
| 2013/0031582 A1* | 1/2013 | Tinsman | H04N 21/2353 725/36 |
| 2013/0341417 A1* | 12/2013 | Argue | G06Q 20/0453 235/494 |
| 2014/0195345 A1* | 7/2014 | Lyren | G06Q 30/0271 705/14.53 |
| 2015/0373385 A1* | 12/2015 | Straub | H04N 21/23412 725/34 |

* cited by examiner

VIDEO ADVERTISEMENT CUSTOMIZATION BY COMPOSITING

BACKGROUND

Advertisements (ads) and/or product or service recommendations may be rendered to users on their user devices, such as electronic devices, mobile communications devices, or the like. These ads and/or product or service recommendations may be provided as standalone content or embedded in one or more web pages served to the user devices of the user. These ads and/or product or service recommendations, in some cases, may be video ads and/or product or service recommendations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Figure 1:
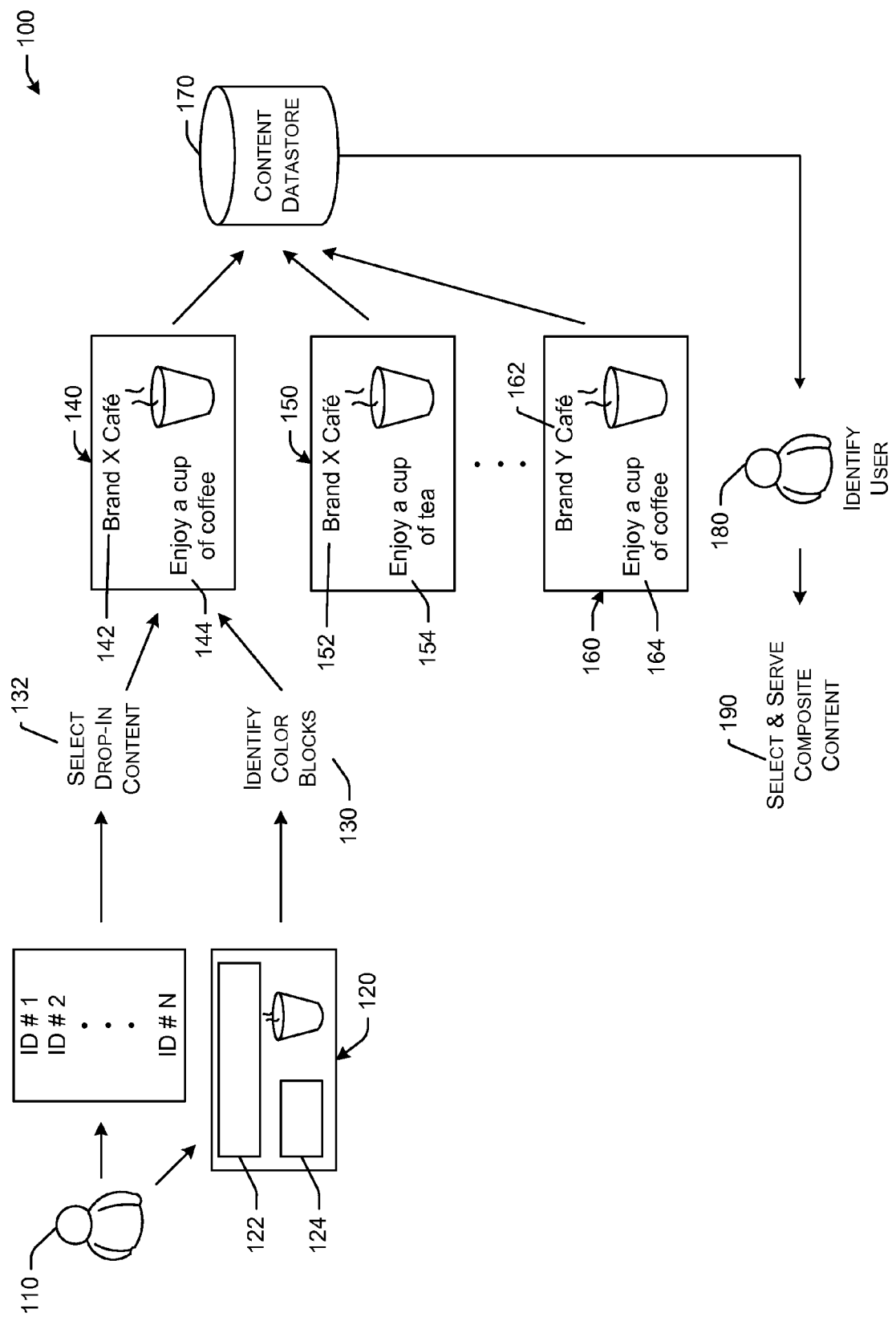
FIG. 1 illustrates a schematic representation of an example process for generating and providing a composite video advertisement, in accordance with example embodiments of the disclosure.

Example embodiments of the present disclosure are directed to, among other things, customizing advertisements (ads), product or service recommendations, and/or content in general. In example embodiments, video ads, or ads with moving images (i.e. a plurality of image frames) may be generated, stored, and/or provided for rendering in accordance with the systems, methods, and apparatus disclosed herein. In example embodiments, one or more compositing server(s) may be configured to receive a template content, such as a video template content. The compositing server(s) may further be configured to identify and/or receive one or more sets of drop-in content. The drop-in content may be combined (i.e. composited) with the video template content to generate one or more respective composite content corresponding to each of one or more sets of drop-in content. In other words, ads, product or service recommendations, and/or content in general may be generated by combining a template content with a selection of drop-in content. It will be appreciated that the systems, methods, and apparatus as disclosed herein, may enable customization of ads for the purposes of geographic, demographic, and/or behavioral targeting of ads. In other words, parameters (i.e. geographic, demographic, behavioral, etc.) associated with a target user may be compared to target demography, geography, and/or behavior associated with a composite content to select a suitable composite content for the target user.

Some example embodiments, as disclosed herein, are directed to an asynchronous process of receiving a video template, receiving sets of drop-in content, generating respective composite content, and storing the respective composite content, such as in a content datastore. The stored composite content may be identified by demographic, geographic, and/or behavioral parameters associated with each of the stored composite content. In these embodiments, when a targeted composite content is requested, one or more of the plurality of composite content may be selected as the targeted content and provided, responsive to the request. When content is requested, demographical, geographical, and/or behavioral targets may be provided in the request for the composite content. These demographical, geographical, and/or behavioral targets may be based at least in part on an identity of a user to whom the composite content (e.g. video ad) is to be provided and information (i.e. demographical, geographical, and/or behavioral) known about the user. In this way video content (i.e. ads, product or service recommendations, etc.) may be target to the user via a variety of suitable channels, such as content providers and/or merchants serving web page(s) to a user device associated with the user.

Alternatively, in other example embodiments, as disclosed herein, a synchronous process may be utilized to target video content (i.e. ads, product or service recommendations, and/or other content). In this case, a request for content may be received, such as by the compositing server(s). The request for content may include demographical, geographical, and/or behavioral targets that may be based at least in part on an identity of a user to whom the content is to be provided and information (i.e. demographical, geographical, and/or behavioral) known about the user. In some example embodiments, a template content and/or a group of products or services, based at least in part on which a template content may be identified, may be provided in and/or with the request for content. Alternatively, in example embodiments, the compositing server(s) may identify a template content associated with the request for content, such as based at least in part on information (i.e. demographical, geographical, and/or behavioral) known about the user for whom the content is request and/or current ad campaigns. Once a template content is identified, a drop-in content set may be identified based at least in part on a comparison between demographical, geographical, and/or behavioral of the target user and demographical, geographical, and/or behavioral parameters of a variety of available drop-in content sets associated with the identified template content. Once a drop-in content set is identified, the compositing server(s) may be configured to generate a composite content by compositing the identified template content with the drop-in content of the identified crop-in content set. This content generation may be done in a synchronous fashion and provided responsive to the content request.

The concepts as discussed above may be better understood with reference to FIG. 1. FIG. 1 illustrates a schematic representation of an example process 100 for generating and providing a composite video advertisement, in accordance with example embodiments of the disclosure. The process may include an ad buyer 110 providing a template content 120, such as a video template content 120. The template content 120 may include one or more color blocks 122, 124, somewhere (e.g., spatial coordinates of the template content 120) and at some time (e.g., temporal coordinates of the template content 120). As depicted, the template content has a color block 122 of a first color and a color block of a second color 124. The template content may further have regions with content, such as a frame image 126 of video content of the template content. This region does not have the color blocks 122, 124. The ad buyer 110 may further provide one or more sets of drop-in content 128. The sets of drop-in content 128 may each have one or more drop-in content therein and the drop-in content may be composited with the template content 120 in accordance with systems, apparatus, and methods of this disclosure. In example embodiments, each of the sets of drop-in content 128 may have one or more of demographic, geographic, and/or behavior parameters associated therewith. These parameters may be associated with a particular composite content based at least in part on the association of the particular parameters to the corresponding drop-in content.

At 130, the color blocks of the template content 120 may be identified. This process 130 may be performed, in example embodiments, by a compositing server. Identifying the color blocks 122, 124 may include determining and/or tabulating the spatial and/or temporal coordinates of each of the color blocks of the template content 120, such as by the compositing servers. The compositing servers may further select drop-in content 132. In example embodiments each of the drop-in content of each of the drop-in content sets 128 associated with the template content may be selected, such as in succession. The compositing servers may further composite the drop-in content with the template content 120, to generate one or more composite content 140, 150, 160. In this case, each composite content 140, 150, 160 may correspond to a respective set of drop-in content. Each set of drop-in content may have a different drop-in content associated with each of the color blocks 122, 124 of the template content. As shown, composite content 140 may have "Brand X Café" drop-in 142 for color block 122 and "Enjoy a cup of coffee" drop-in for color block 124. In this case, the drop-in 142 may be the same as the drop-in 152 of composite content 150. However, the drop-in content 154 of composite content 150 of "Enjoy a cup of tea" may be different from the drop-in content 144 of composite content 140. Further still, the drop-in content 164 of composite content 160 may be the same as drop-in content 144 of composite content 140. However, the drop-in content 162 of "Brand Y Café" may be different from the drop-in content 142.

Once the composite content 140, 150, 160 are generated, the composite content 140, 150, 160 may be stored, such as in a content datastore 170. In some cases, each of the composite content 140, 150, 160 may be stored in association with corresponding respective demographic, geographic, and/or behavior parameters. These parameters may indicate a target user to whom to target particular composite content 140, 150, 160.

Next, a target user 180 may be identified. The identification may be as a result of self-identification (e.g. providing log-in authentication to a server or a name), identifying a user device used by the user 180, or the like. Once, the user is identified, there may be a variety of accessible information associated with the user 180. The information associated with the user may include demographical, geographical, and/or behavioral information. For example, it may be known where the user 180 resides, where the user 180 currently is located, what products or services the user has purchased, what media content and/or web pages the user 180 has visited, the user's interests, or the like. Based at least in part on the user's 180 demographical, geographical, and/or behavioral information and a match of the same to parameters associated with each of the composite content 140, 150, 160, a composite content 140, 150, 160 may be selected and served 190 to the user 180.

As a non-limiting example, suppose the user 180 is currently in a location where an entity does business as "Brand Y Café," rather than "Brand X Café," and therefore, composite content 160 may be served to the user 180. As another non-limiting example, consider that the user is identified as liking tea rather than coffee and is located in a region where the entity associated with the ad buyer 110 does business as "Brand X Café." In this case, composite content 150 may be served to the user 180.

It will be appreciated that the systems, apparatus, and methods, as disclosed herein may enable a relatively high level of customization of ads, product or service recommendations, and/or any type of content. Therefore, a relatively high and/or granular level of targeting may be achieved, such as with video-based ads, without having to create a new ad for every target. Instead, target ads may be generated by the processes of compositing, particularly using chroma-key techniques, where color blocks or other pixel patterns are identified and are recognized as being locations/times for replacement with other drop-in content. The pixel patterns other than color blocks may include image/video pattern(s), quick response (QR) code(s), transparent regions, white regions, a predetermined sequence of pixels, a particular color at a particular pixel location, combinations thereof, or the like. The techniques as disclosed herein may be especially suitable for entities that may have a relatively large portfolio of products, a relatively large portfolio of marks, and/or a relatively wide geographic reach, and wish to provide targeted ads, product or service recommendations, and or general content in a relatively efficient manner across their portfolio of products, services, marks, and/or geography. According to example embodiments of the disclosure, composite content may be any suitable content, including video and/or audio/video (A/V) content. The drop-in content may be any suitable content, including text, images, video, audio, haptics, combinations thereof, or the like. While text, image, and/or video drop-in content may be composited onto a template content by replacing one or more color blocks or pixel patterns with the drop-in content, for compositing and/or incorporating audio and/or haptic drop-in content onto a template content, no color blocks and/or pixel patterns may be replaced. In some example embodiments, audio and/or haptic drop-in content may be combined with the template content based on pixel patterns that may be relatively unnoticeable by a viewer of the resulting composite content. For example, the audio and/or haptic drop-in content may be combined with the template content upon detecting a pattern of a few pixels on the edge of the template content that may be difficult for a viewer to notice or may be cropped prior to rendering.

This brief introduction, including section titles and corresponding summaries, is provided for the reader's convenience and is not intended to limit the scope of the claims nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 2:
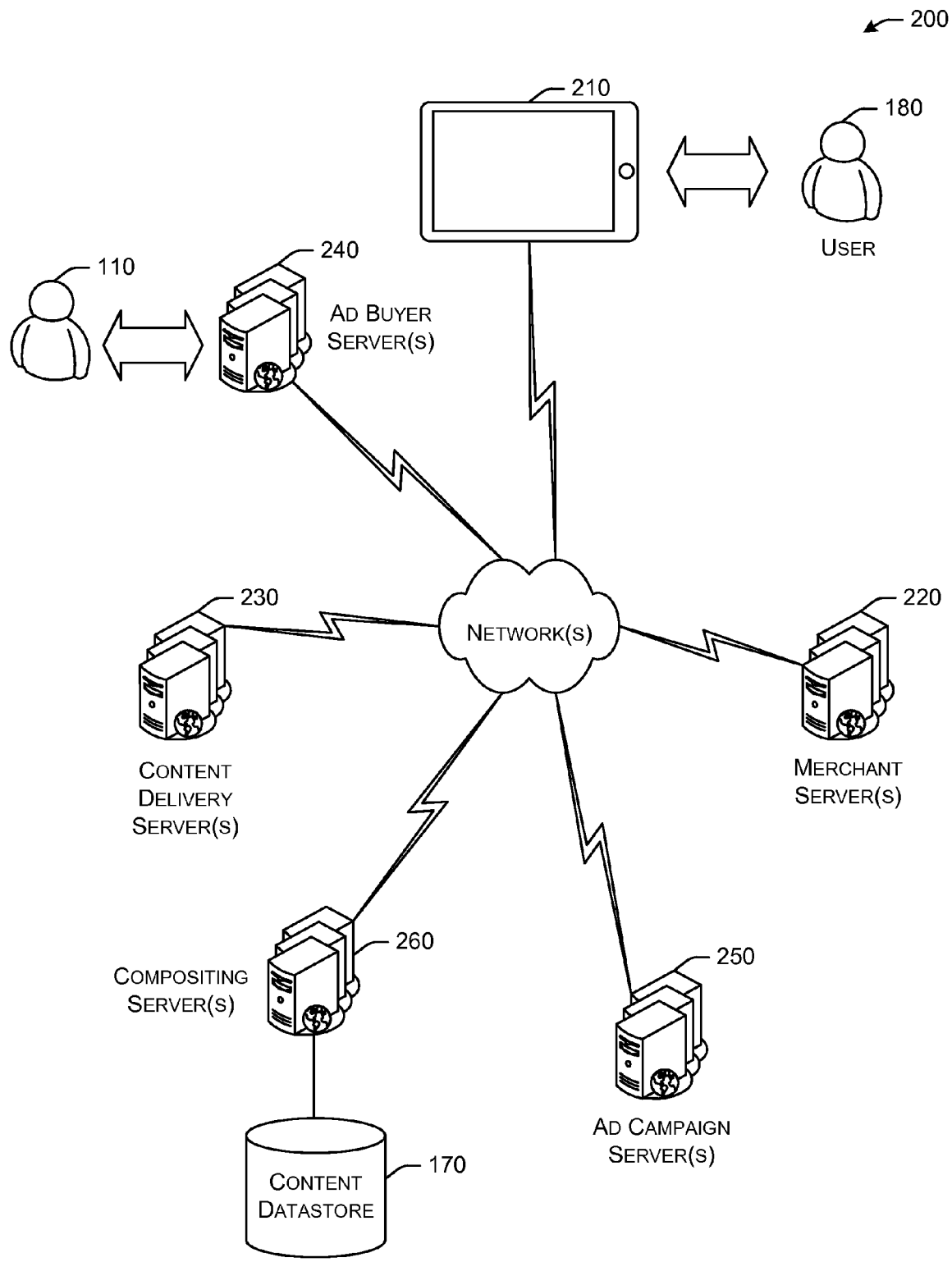
FIG. 2 illustrates a schematic representation of an example environment including one or more compositing server(s) for generating and providing composite video advertising, in accordance with example embodiments of the disclosure.

FIG. 2 illustrates a schematic representation of an example environment 200 including one or more compositing server(s) 260 for generating and providing composite video advertising, in accordance with example embodiments of the disclosure. The environment 200 may further include one or more ad buyers 110 that may interact with one or more ad buyer server(s) 240, one or more users 180 that may interact with their respective user device(s) 210, one or more merchant server(s) 220, one or more content delivery server(s) 230, one or more ad campaign server(s) 250, and one or more network(s) to communicatively couple the elements 210, 22, 230, 240, 250, 260 of environment 200.

The ad buyers 110 may be individuals or other entities, such as corporations, non-profit organizations, for-profit organizations, government organizations, public sector organizations, or any of the aforementioned entities located in this country or foreign countries that may be able to direct the purchase of ad assets and/or provide ads, or components thereof, via the ad buyer server(s) 240 to one or more of the compositing server(s) 260, ad campaign server(s) 250, or any other entity of environment 200. The ad buyer server(s) 240, therefore, may be configured, at least in part to receive, identify, and/or transmit ads and/or other content, or portions thereof.

In example embodiments, the ad buyer server(s) 240 may be configured to provide video ad content and/or portions thereof, such as template content associated with a grouping of products or services and/or drop-in content sets that include drop-in content that may be composited with template content. In example embodiments, the ad buyer server(s) 240 may be configured to provide template content and/or drop-in content, such as in packages of drop-in content sets, to the compositing server(s) 260, either directly or via one or more other entities, such as the ad campaign server(s) 250. The ad buyer server(s) 240 may further be configured to provide information regarding product(s) or service(s) association and/or advertiser association of one or more template content, such as video template content, provided to the compositing server(s) 160 via the one or more networks 270, either directly or via the ad campaign server(s) 250. The ad buyer server(s) 240 may still further be configured to provide association information of one or more drop-in content sets with a template content. In other words, the ad buyer server(s) 240 may be configured to provide a listing of available drop-in content sets that may be used with a particular template content to generate composite content. The ad buyer server(s) 240 may yet further be configured to provide association information of one or more drop-in content within each drop-in content set. This association information may provide a mapping of color blocks (e.g., colors) or other pixel patterns that may include image/video pattern(s), quick response (QR) code(s), transparent regions, white regions, a predetermined sequence of pixels, a particular color at a particular pixel location, combinations thereof, or the like, of the template content to respective drop-in content. In general, the color blocks and/or other pixel patterns may be recognizable by the compositing server(s) 260 or other entities. Throughout this disclosure, although color block(s) may be used as an identifier of compositing drop-in content with template content, it will be understood that any variety of pixel patterns recognizable by the compositing server(s) 260 may be used other than or in addition to color block(s). According to example embodiments of the disclosure, drop-in content may be any suitable content, including text, images, video, audio, haptics, combinations thereof, or the like, and may be provided by the ad buyer server(s) 240 to the compositing server(s) 260 as part of one or more drop-in content sets, either directly or via the ad campaign server(s) 250.

The users 180 may be individuals or other entities, such as corporations, non-profit organizations, for-profit organizations, government organizations, public sector organizations, or any of the aforementioned entities located in this country or foreign countries. In example embodiments, information about the user 180 may be known and/or ascertained by any suitable mechanism by one or more entities of environment 200, such as merchant server(s) 220, content delivery network(s) 230, ad campaign server(s) 250, and/or compositing server(s) 260. In example embodiments, user 180 may be able to self-identify himself/herself to one or more of these entities 220, 230, 250, 260, such as by providing identification information (e.g., name, login and/or authentication credentials, etc.) via his or her user device 210 and the networks 270 or by allowing his/her user device 210 identity to be determined by one or more of the entities 220, 230, 250, 260.

The networks 270 may include any one or a combination of different types of suitable communications networks, such as cable networks, the Internet, wireless networks, cellular networks, and other private and/or public networks. Furthermore, the networks 270 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

The user devices 210 may be any one of suitable devices that may be configured to execute applications, provide services to the users 110, and/or connect, continuously or intermittently, to the one or more networks 270. The user device 210 may include, but is not limited to, a personal computer, a desktop computer, a notebook computer, a laptop computer, a personal digital assistant, an electronic book (ebook) reader, a tablet computing device, a pad computing device, a smartphone, or combinations thereof. The user devices 210 may further include one or more user interfaces to accept user 180 input, provide output to the user 110, and/or otherwise provide a mechanism for the user 180 to interact with the user device 210. The user interfaces of the user device 210 may include, but are not limited to, one or more user input/output interfaces, such as a display, a touch sensitive display, a speaker, a haptic output, or the like. The user device 210 may be configured to request content and/or webpages from one or more of the merchant server(s) 220 and/or content delivery server(s) 230 on behalf of the user 180, such as via the networks 270. Responsive to the request for content and/or webpages, the user device 210 may be configured to receive the requested content and/or webpages, such as from the merchant server(s) 220 and/or the content delivery server(s) 230 and render the same to the user 180. In example embodiments, the user devices 210 may further be configured to receive and render composite content, as generated by the processes described herein, to the user 180. This composite content, in example embodiments may be generated by the compositing server(s) 260 and provided to the user device 210 from any one of the merchant server(s) 220, the content delivery server(s) 230, and/or the compositing server(s) 260.

The merchant server(s) 220 may be configured to receive a request from the user device 210 on behalf of the user 180 for one or more webpages. The merchant server(s) 220 may further be configured to identify the user 180 associated with the request for one of more webpages. The merchant server(s) 220 may be configured to identify the user 180 by any suitable mechanism, including, for example, self-identification by the user 180 (e.g. providing log-in authentication to the merchant server(s) 220 or a name), identifying a user device 210 used by the user 180, or the like. Upon identifying the user 180, the merchant server(s) 220 may be configured to generate and transmit a request for composite content, such as a video advertisement or product or service recommendation, to the compositing server(s) 260 or any other suitable entity of environment 200. In example embodiments, the request for composite content may include an identification of the user 180 and/or a list of target parameters, such as demographical, geographical, and/or behavioral targets. These target parameters may provide a mechanism to better target content, such as ads and/or product or service recommendations, to particular users 180. The merchant server(s) 220, responsive to a request for composite content, may be configured to receive a composite content, such as in the form of a video ad and/or a product or service recommendation. This composite content, in example embodiments, may be received from the compositing server(s) 260. The merchant server(s) 220 may be configured to incorporate the received composite content into webpage(s) and/or content it serves to the user device 210 for the user 180 via the networks 270.

The content delivery server(s) 230 may be configured to receive a request from the user device 210 on behalf of the user 180 for one or more media content and/or webpages. The content delivery server(s) 230 may further be configured to identify the user 180 associated with the request for content. The content delivery server(s) 230 may be configured to identify the user 180 by any suitable mechanism, including, for example, self-identification by the user 180 (e.g. providing log-in authentication to the content delivery server(s) 230 or a name), identifying a user device 210 used by the user 180, or the like. Upon identifying the user 180, the content delivery server(s) 230 may be configured to generate and transmit a request for composite content, such as a video advertisement or product or service recommendation, to the compositing server(s) 260 or any other suitable entity of environment 200. In example embodiments, the request for composite content may include an identification of the user 180 and/or a list of target parameters, such as demographical, geographical, and/or behavioral targets. These target parameters may provide a mechanism to better target content, such as ads and/or product or service recommendations, to particular users 180. The content delivery server(s) 230, responsive to a request for composite content, may be configured to receive a composite content, such as in the form of a video ad and/or a product or service recommendation. This composite content, in example embodiments, may be received from the compositing server(s) 260. The content delivery server(s) 230 may be configured to provide the composite content to the user device 210 by transmitting the same and/or be configured to incorporate the received composite content into webpage(s) and/or content it serves to the user device 210 for the user 180 via the networks 270.

The ad campaign server(s) 250 may be configured to track ad campaigns that may be running, such as ad campaigns that may distribute composite content and/or video ads. In some example embodiments, the ad campaign server(s) 250 may be configured to act as an intermediary between the compositing server(s) 260 and a variety of other entities, such as the ad buyer server(s) 240, merchant server(s) 220, and/or the content delivery server(s) 230. The ad campaign server(s) 250, in example embodiments, may be configured to provide the compositing server(s) 260 with template content and/or sets of drop-in content that may be received from other sources, such as the ad buyer server(s) 240. The ad campaign server(s) 250 may further be configured to provide the compositing server(s) 260 with one or more requests for composite content that may, again, be received form one or more other sources, such as the merchant server(s) 220 or the content delivery server(s) 230. The ad campaign server(s) 250 may further be configured to provide the compositing server(s) 260 with information related to current ad campaigns, such as products or services that are currently being advertised and/or targeted. This type of information may be utilized for the purposes of selecting template content related to types and/or groups of products or services.

The compositing server(s) 260 may be configured to receive one or more template content. This template content may be associated with a grouping of products or services or a particular advertiser. The template content may further include one or more color blocks therein, that the compositing server(s) 260 may be configured to replace with one or more other content, such as drop-in content from sets of drop-in content associated with the template content. The compositing sever(s) 260 may also receive sets of drop-in content associated with one or more template content. These sets of drop-in content may each contain one or more drop-in content that may be used to replace color blocks in the associated template content or be combined with the template content upon recognizing a pixel pattern in the template content. Throughout this disclosure, although color block(s) may be used as an identifier of compositing drop-in content with template content, it will be understood that any variety of pixel patterns recognizable by the compositing server(s) 260 may be used other than or in addition to color block(s). The compositing server(s) 260 may further receive a mapping of drop-in content (e.g., color association of each drop-in content of a set of drop-in content), as part of or along with, each set of drop-in content. The compositing server(s) 260 may be configured to receive the template content and/or drop-in content from any suitable source, such as the ad buyer server(s) 240 and/or the ad campaign server(s) 250. In some example embodiments, the compositing server(s) 260 may be configured to store the received template content and/or drop-in content in a datastore, such as the content datastore 170. In example embodiments, the compositing server(s) 260 may be configured to store the received template content in association with a corresponding ad campaign identifier, advertiser, and/or product or service grouping. In example embodiments, the compositing server(s) 260 may further be configured to store the drop-in content and or drop-in content sets associated with their corresponding respective parameters, such as demographic, geographic, and/or behavior parameters.

The compositing server(s) 260 may be configured to determine the spatial bounds and/or the temporal bounds of the color blocks in the template content to insert the appropriate drop-in content within the template content to generate the composite content. In other words, the compositing server(s) may be configured to analyze a particular template content and identify the pixels or range of pixels of the content, as well as the start and end times and/or frames of the content to define each of the color blocks within the template content. The compositing server(s) 260 may be configured to identify a particular color block as a relatively large (e.g., 100 pixels×100 pixels) block of a single color (e.g., green, blue, pink, etc.). The compositing server(s) 260 may be configured to tabulate the temporal and/or spatial information associated with each color block of a template content. Upon determining and/or tabulating this color block information, the compositing server(s) 260 may be configured to replace the pixels, blocks, times, and/or frames associated with each of the color blocks of the template content with its corresponding drop-in content from a particular drop-in content set. In alternative embodiments, the spatial and/or temporal information associated with the color blocks may be received as part of (e.g. as metadata) or along with the template content. In this case, the spatial and/or temporal information may have been determined and/or generated by another entity, such as the ad buyer server(s) 240.

The compositing server(s) 260 may be configured to generate composite content based at least in part on the received template content and associated drop-in content sets. In example embodiments, the compositing server(s) 260 may be configured to generate a different composite content associated with each of the sets of drop-in content associated with a particular template content. The composite content may be generated by replacing the color blocks within the template content by the corresponding drop-in content within each of the drop-in content sets. The drop-in times and locations may be based on the temporal and/or spatial location of each of the color blocks. The drop-in content may be any suitable content, including text, images, video, audio, haptics, combinations thereof, or the like. Upon generating the composite content, the compositing server(s) 260 may be configured to store the composite content in a datastore, such as the content datastore 170. In example embodiments, each of the composite content may be stored in the content datastore 170 as associated with its respective parameters, such as demographic, geographic, and/or behavioral parameters. In some cases, a particular set of these parameters may be associated with a particular composite content based at least in part on the association of the particular parameters to the corresponding drop-in content. By storing the composite content, the compositing server(s) 260 may be configured to provide one or more of the composite content responsive to a request for composite content in an asynchronous manner (e.g., the composite content is prefabricated prior to receiving a request for composite content).

In certain example embodiments, the compositing server(s) 260 may be configured to composite text, image, and/or video drop-in content with template content by replacing one or more color blocks or pixel patterns with the drop-in content. In further example embodiments, the compositing server(s) 260 may be configured to incorporate audio and/or haptic drop-in content onto a template content, where no color blocks and/or pixel patterns may be replaced. In some of these example embodiments, audio and/or haptic drop-in content may be combined with the template content based on pixel patterns that may be relatively unnoticeable by a user 180 viewing the resulting composite content. For example, the compositing server(s) 260 may be configured to combine audio and/or haptic drop-in content with the template content upon detecting a pattern of a few pixels on the edge of the template content that may be difficult for a viewer to notice or may be cropped prior to rendering.

The compositing server(s) 260 may further be configured to receive a request for composite content from the merchant server(s) 220 or the content delivery server(s) 230, either directly or via an intermediary entity, such as the ad campaign server(s) 250. In example embodiments, the request for composite content may include an identification of the user 180 and/or a list of target parameters, such as demographical, geographical, and/or behavioral targets. In further example embodiments, the request for composite content may provide an indication of a targeted ad campaign, advertiser, and/or grouping of products or services. Upon receiving the request for composite content, the compositing server(s) 260 may be configured to select a group of composite content, such as composite content associated with and/or derived form a particular template content, composite content associated with a particular group of products or services, and/or composite content associated with a particular advertiser. The compositing server(s) 260 may utilize information such as indication(s) of a targeted ad campaign, advertiser, and/or grouping of products or services to short-list a group of composite content. Once a grouping of composite content from which to select a composite content is identified, the compositing sever(s) 260 may be configured to compare the parameters associated with each of the composite content with the target parameters to select the composite content that it will provide responsive to the request for composite content. In the comparison, the compositing server(s) 260 may be configured to determine how many parameters of various composite content match with the target parameters received with the request for composite content. In some cases, a pure number of matches may be considered for selecting a best match composite content to the target parameters. In alternative methods a scoring and/or weighted mechanism may be used to identify a best match composite content.

In further example embodiments, the compositing server(s) 260 may be configured to provide composite content in a synchronous manner responsive to a request for composite content. In this case, the compositing server(s) 260 may receive a request for composite content along with target parameters, as described above. The compositing server(s) 260 may be configured to use the targeting parameters to identify a best match or good match set of drop-in content. Then the compositing server(s) 260 may be configured to utilize the best matched or good matched set of drop-in content to generate a corresponding composite content responsive to the request for composite content and transmit the same.

Figure 3:
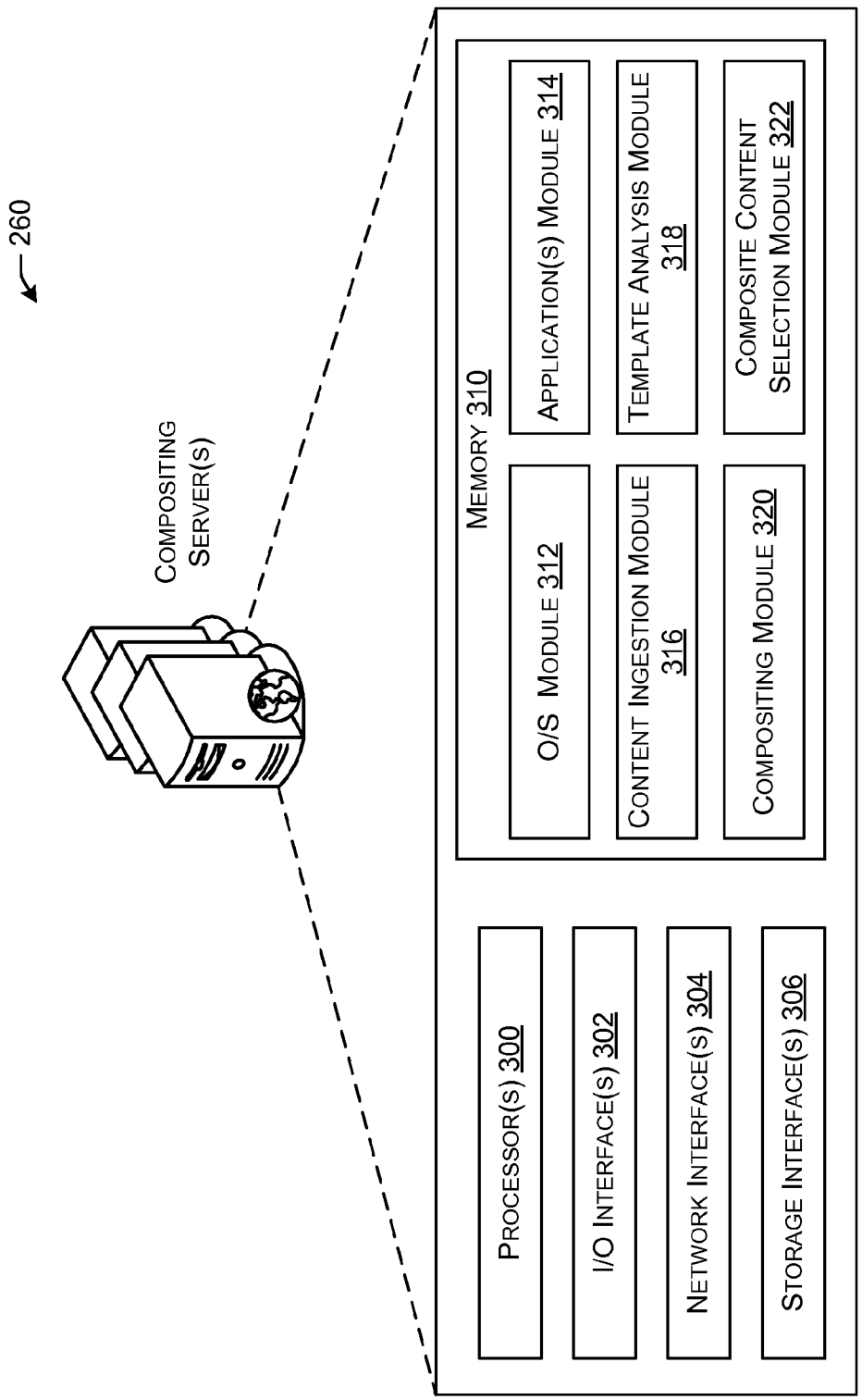
FIG. 3 illustrates a block diagram of the one or more compositing server(s) for video ad compositing, in accordance with example embodiments of the disclosure.

FIG. 3 illustrates a block diagram of the one or more compositing server(s) 260 for video ad compositing, in accordance with example embodiments of the disclosure. The compositing server(s) may include one or more processors 300, one or more I/O device interfaces 302, one or more network interface(s) 304, one or more storage interface(s) 306, and one or more memories 310.

In some example embodiments, the processors 300 of the compositing server(s) 260 may be implemented as appropriate in hardware, software, firmware, or combinations thereof. Software or firmware implementations of the processors 300 may include computer-executable or machine-executable instructions written in any suitable programming language to perform the various functions described. Hardware implementations of the processors 300 may be configured to execute computer-executable or machine-executable instructions to perform the various functions described. The one or more processors 300 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The compositing server(s) 260 may also include a chipset (not shown) for controlling communication between the one or more processors 300 and one or more of the other components of the compositing server(s) 260. The one or more processors 300 may also include one or more application specific integrated circuits (ASICs) or application specific standard products (ASSPs) for handling specific data processing functions or tasks.

The input/output (I/O) device(s) such as the touch sensitive display screen(s), speaker(s), haptic device(s), or the like, may be controlled via the one or more I/O device interfaces 302. The network interfaces(s) 304 may allow the compositing server(s) 260 to communicate via the networks 270 and/or via other communicative channels. The compositing server(s) 260 may, therefore, be configured to access one or more remote servers, cloud servers, and/or cloud storage resources. The storage interface(s) 306 may enable the compositing server(s) 260 to read and/or write to any variety of datastores, including, for example, the content datastore 170.

The memory 310 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 310 may store program instructions that are loadable and executable on the processor(s) 300, as well as data generated or received during the execution of these programs. Turning to the contents of the memory 310 in more detail, the memory 310 may include one or more operating systems (O/S) 312, an applications module 314, a content ingestion module 316, a template analysis module 318, a compositing module 320, and a composite content selection module 322. Each of the modules and/or software may provide functionality for the compositing server(s) 260, when executed by the processors 300. The modules and/or the software may or may not correspond to physical locations and/or addresses in memory 310. In other words, the contents of each of the modules 312, 314, 316, 318, 320, 322 may not be segregated from each other and may, in fact be stored in at least partially interleaved positions on the memory 310.

The O/S module 312 may have one or more operating systems stored thereon. The processors 300 may be configured to access and execute one or more operating systems stored in the (O/S) module 312 to operate the system functions of the compositing server(s) 260. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 314 may contain instructions and/or applications thereon that may be executed by the processors 300 to provide one or more services. These instructions and/or applications may, in certain aspects, interact with the (O/S) module 312 and/or other modules of the compositing server(s) 260. The applications module 314 may have instructions, software, and/or code stored thereon that may be launched and/or executed by the processors 300 to execute one or more applications and functionality associated therewith. These applications may include, but are not limited to, functionality such as web browsing, business, communication, graphics, word processing, publishing, spreadsheets, databases, gaming, education, entertainment, media, project planning, engineering, drawing, or combinations thereof. In certain embodiments, the applications that are stored in the applications module 314 and executable by the processors 300 may provide functionality associated with compositing content, such as video content based on template content and drop-in content. Furthermore, the processors 300 may be configured to provide one or more composite content in either an asynchronous manner or a synchronous manner responsive to a request for composite content.

The content ingestion module 316 may have instructions stored thereon that when executed by the processors 300, configure the compositing server(s) 260 to perform a variety of functions associated with receiving template content and/or drop-in content. The received template content may be associated with a grouping of products or services or a particular advertiser. The template content may further include one or more color blocks therein, that the processors 300 may be configured to replace with one or more other content, such as drop-in content from sets of drop-in content associated with the template content, by the processes enabled by the instructions stored in the compositing module 320. The processors 300 may also be configured to receive sets of drop-in content associated with one or more template content. These sets of drop-in content may each contain one or more drop-in content that may be used to replace color blocks in the associated template content. The processors 300 may further be configured to receive a mapping of drop-in content (e.g., color association of each drop-in content of a a set of drop-in content), as part of or along with, each set of drop-in content. The processors 300 may be configured to receive the template content and/or drop-in content from any suitable source, such as the ad buyer server(s) 240 and/or the ad campaign server(s) 250, via the networks 270. In some example embodiments, the processors 300 may be configured to store the received template content and/or drop-in content in a datastore, such as the content datastore 170. In example embodiments, the processors 300 may be configured to store the received template content in association with a corresponding ad campaign identifier, advertiser, and/or product or service grouping. In example embodiments, the compositing server(s) 260 may further be configured to store the drop-in content and or drop-in content sets associated with their corresponding respective parameters, such as demographic, geographic, and/or behavior parameters.

The template analysis module 318 may have instructions stored thereon that when executed by the processors 300 may enable the compositing server(s) 260 to provide various functionality associated with analyzing the template content for the purposes of compositing. The processors 300 may be configured to determine the spatial bounds and/or the temporal bounds of the color blocks in the template content to insert the appropriate drop-in content within the template content to generate the composite content. In other words, the compositing server(s) may be configured to analyze a particular template content and identify the pixels or range of pixels of the content, as well as the start and end times and/or frames of the content to define each of the color blocks within the template content. The processors 300 may be configured to identify a particular color block as a relatively large (e.g., 300 pixels×150 pixels) block of a single color (e.g., magenta, blue, red, etc.). The processors 300 may be configured to tabulate the temporal and/or spatial information associated with each color block of a template content. Upon determining and/or tabulating this color block information, the processors 300 may be configured to replace the pixels, blocks, times, and/or frames associated with each of the color blocks of the template content with its corresponding drop-in content from a particular drop-in content set. In alternative embodiments, the spatial and/or temporal information associated with the color blocks may be received as part of (e.g., as metadata) or along with the template content. In this case, the spatial and/or temporal information may have been determined and/or generated by another entity, such as the ad buyer server(s) 240.

The compositing module 320 may have instructions stored thereon that when executed by the processors 300 may enable the compositing server(s) 260 to provide various functionality associated with compositing the template content with the drop-in content to generate composite content. The processors 300 may be configured to generate composite content based at least in part on the received template content and associated drop-in content sets. In example embodiments, the processors 300 may be configured to generate a different composite content associated with each of the sets of drop-in content associated with a particular template content. The composite content may be generated by the processors 300 by replacing the color blocks within the template content by the corresponding drop-in content within each of the drop-in content sets. The drop-in times and locations may be based on the temporal and/or spatial location of each of the color blocks. The drop-in content may be any suitable content, including text, images, video, audio, haptics, combinations thereof, or the like. In some example embodiments, the processors 300 may be configured to perform a variety of image manipulation techniques to properly insert and/or replace a color block with its corresponding drop-in content. These techniques may be useful in cases where the drop-in content does not perfectly fit the color block space and/or time allocated in the template content. For example, either or both of the drop-in content or the template content may be manipulated by techniques, such as image/video filtering, image/video sharpening, modifying an image/video orientation, modifying the dithering of one or more pixels of the image/video, modifying the contrast of the image/video, modifying the brightness of the image/video, truncating pixels of the image/video, truncating frames and/or time of the video, or combinations thereof.

Upon generating the composite content, the processors 300 may store the composite content in a datastore, such as the content datastore 170. In example embodiments, each of the composite content may be stored in the content datastore 170 as associated with its respective parameters, such as demographic, geographic, and/or behavioral parameters. In some cases, a particular set of these parameters may be associated with a particular composite content based at least in part on the association of the particular parameters to the corresponding drop-in content. By storing the composite content, the processors 300 may be configured to provide one or more of the composite content responsive to a request for composite content in an asynchronous manner (e.g., the composite content is prefabricated prior to receiving a request for composite content).

It will also be appreciated that in some example embodiments, the drop-in content that is composited with the template content may itself include one or more color blocks and/or pixel patterns that may indicate incorporation of further drop-in content (e.g., nested drop-in content). In these embodiments, the compositing module 320 may include instructions that when executed by the processors 300 may enable the compositing server(s) 260 to provide functionality associated with nested drop-in content selection and compositing. The nested drop-in content may be of any suitable variety, such as text, images, video, audio, haptic, combinations thereof, or the like. In example embodiments, the template content and the drop-in content incorporated therein may enable any number of nested drop-in content hierarchies.

The composite content selection module 322 may have instructions stored thereon that when executed by the processors 300 may enable the compositing server(s) 260 to provide various functionality associated with selecting content to provide responsive to receiving a request for composite content. The processors 300 may further be configured to receive a request for composite content from the merchant server(s) 220 or the content delivery server(s) 230, either directly or via an intermediary entity, such as the ad campaign server(s) 250. In example embodiments, the request for composite content may include an identification of the user 180 and/or a list of target parameters, such as demographical, geographical, and/or behavioral targets. In cases, where the user 180 is identified in the request for composite content, but not target parameters, the processors 300 may be configured to access one or more datastores and/or solicit one or more other entities to identify one or more target parameters of the user 180, such as demographical, geographical, and/or behavioral information associated with the user 180. In further example embodiments, the request for composite content may provide an indication of a targeted ad campaign, advertiser, and/or grouping of products or services. Upon receiving the request for composite content, the processors 300 may be configured to select a group of composite content, such as composite content associated with and/or derived form a particular template content, composite content associated with a particular group of products or services, and/or composite content associated with a particular advertiser. The processors 300 may be configured to utilize information such as indication(s) of a targeted ad campaign, advertiser, and/or grouping of products or services to shortlist a group of composite content. Once a grouping of composite content from which to select a composite content is identified, the processors 300 may be configured to compare the parameters associated with each of the composite content with the target parameters to select the composite content that it will provide responsive to the request for composite content. In the comparison, the processors 300 may be configured to determine how many parameters of various composite content match with the target parameters received with the request for composite content. In some cases, a pure number of matches may be considered for selecting a best match composite content to the target parameters. In alternative methods a scoring and/or weighted mechanism may be used to identify a best match composite content.

In further example embodiments, the processors 300 may be configured to provide composite content in a synchronous manner responsive to a request for composite content. In this case, the compositing server(s) 260 and the processors 300 thereon may receive a request for composite content along with target parameters, as described above. The processors 300 may be configured to use the targeting parameters to identify a best match or good match set of drop-in content. Then the processors 300 may be configured to utilize the best matched or good matched set of drop-in content to generate a corresponding composite content responsive to the request for composite content and transmit the same.

It will be appreciated that there may be overlap in the functionality of the instructions stored in the operating systems (O/S) module 312, the applications module 314, the content ingestion module 316, the template analysis module 318, the compositing module 320, and the composite content selection module 322. In fact, the functions of the aforementioned modules 312, 314, 316, 318, 320, 322 may interact and cooperate seamlessly under the framework of the compositing server(s) 260. Indeed, each of the functions described for any of the modules 312, 314, 316, 318, 320, 322 may be stored in any module 312, 314, 316, 318, 320, 322 in accordance with certain example embodiments of the disclosure. Further, in certain example embodiments, there may be one single module that includes the instructions, programs, and/or applications described within the operating systems (O/S) module 312, the applications module 314, the content ingestion module 316, the template analysis module 318, the compositing module 320, and the composite content selection module 322.

Illustrative Processes

Figure 4:
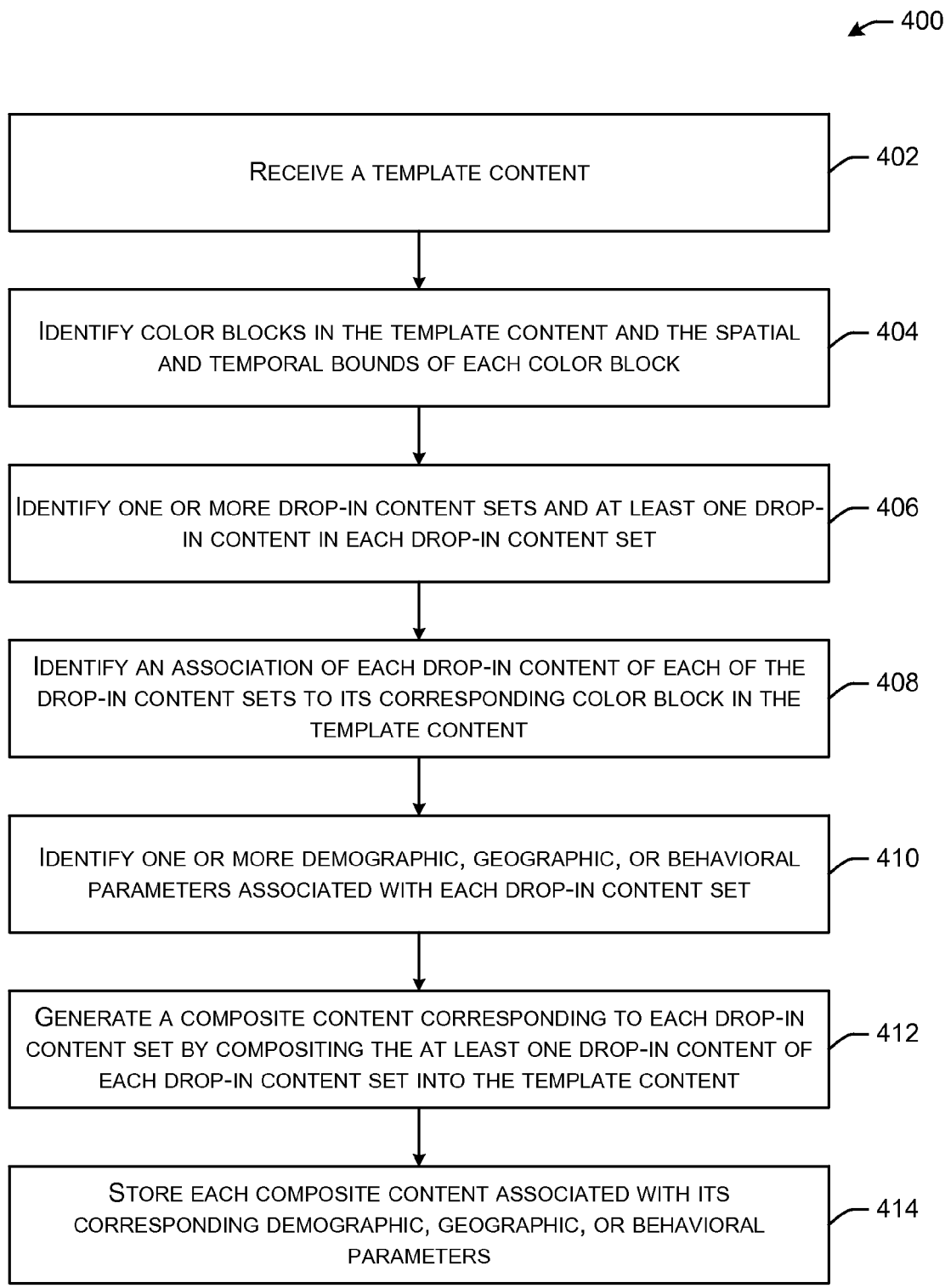
FIG. 4 illustrates a flow diagram of an example method for generating and storing composite ad content in an asynchronous manner, in accordance with example embodiments of the disclosure.

FIG. 4 illustrates a flow diagram of an example method 400 for generating and storing composite ad content in an asynchronous manner, in accordance with example embodiments of the disclosure. The method 400 may be performed, in example embodiments, by the compositing server(s) 260 and the processors 300 thereon. In example embodiments, the compositing server(s) 260 may cooperate with other entities of environment 200 to perform method 400.

At block 402, a template content may be received. The template content may be received from a variety of sources including, for example from any suitable source, such as the ad buyer server(s) 240 and/or the ad campaign server(s) 250, via the networks 270. The received template content may be associated with a grouping of products or services or a particular advertiser. The template content may further include one or more color blocks therein, that the processors 300 may be configured to replace with one or more other content, such as drop-in content from sets of drop-in content associated with the template content. It will be appreciated that in some example embodiments, any pre-determined pixel pattern may be used instead of or in addition to color blocks within the template content to indicate replacement and/or incorporation of drop-in content. In some example embodiments, the received template content may be stored in a datastore, such as the content datastore 170. In further example embodiments, the received template content may be stored in association with a corresponding ad campaign identifier, advertiser, and/or product or service grouping.

At block 404, color blocks in the template and the spatial and temporal bounds of each color block may be identified. This may be determined to enable insertion of the appropriate drop-in content within the template content to generate the composite content. The template content may be analyzed and the pixels or range of pixels of the template content, as well as the start and end times and/or frames of the template content where a particular color block appears may be identified. The temporal and/or spatial information associated with each color block of the template content may be tabulated. In alternative embodiments, the spatial and/or temporal information associated with the color blocks may be received as part of (e.g., as metadata) or along with the template content. In this case, the spatial and/or temporal information may have been determined and/or generated by another entity, such as the ad buyer server(s) 240.

At block 406, one or more drop-in content sets and at least one drop-in content in each set may be identified. The drop-in content sets associated with the template content may be received from any variety of sources, such as the ad buyer server(s) 240 and/or the ad campaign server(s) 250, via the networks 270. These sets of drop-in content may each contain one or more drop-in content that may be used to replace color blocks in the associated template content. In some example embodiments, the received template content and/or drop-in content may be stored in a datastore, such as the content datastore 170. At block 408, an association of each drop-in content of each of the drop-in content sets to its corresponding color block in the template content may be identified. In example embodiments, a mapping of drop-in content (e.g., color association of each drop-in content of a set of drop-in content) may be received, as part of or along with, each set of drop-in content.

At block 410, one or more demographic, geographic, or behavioral parameters associated with each drop-in content set may be identified. In example embodiments, these parameters may be received along with the sets of drop-in content. In example embodiments, the drop-in content and or drop-in content sets may be stored as associated with their corresponding respective parameters, such as demographic, geographic, and/or behavior parameters.

At block 412, a composite content corresponding to each drop-in content set may be generated by compositing the at least one drop-in content of each drop-in content set into the template content. The composite content may be generated by replacing the color blocks within the template content with the corresponding drop-in content within each of the drop-in content sets. The drop-in times and locations may be based on the temporal and/or spatial location of each of the color blocks, as determined by the processes of block 404. The drop-in content may be any suitable content, including text, images, video, audio, haptic, combinations thereof, or the like. In some example embodiments, a variety of image manipulation techniques may be performed to properly insert and/or replace a color block with its corresponding drop-in content. These techniques may be useful in cases where the drop-in content does not perfectly fit the color block space and/or time allocated in the template content. For example, either or both of the drop-in content or the template content may be manipulated by techniques, such as image/video filtering, image/video sharpening, modifying an image/video orientation, modifying the dithering of one or more pixels of the image/video, modifying the contrast of the image/video, modifying the brightness of the image/video, truncating pixels of the image/video, truncating frames and/or time of the video, or combinations thereof. In some example embodiments, audio and/or haptic drop-in content may be combined with the template content based on pixel patterns that may be relatively unnoticeable by a viewer of the resulting composite content. For example, the audio and/or haptic drop-in content may be combined with the template content upon detecting a pattern of a few pixels on the edge of the template content that may be difficult for a viewer to notice or may be cropped prior to rendering.

At block 414, each composite content may be stored as associated with its corresponding demographic, geographic, or behavioral parameters. In example embodiments, each of the composite content may be stored in the content datastore 170 as associated with its respective parameters, such as demographic, geographic, and/or behavioral parameters. In some cases, a particular set of these parameters may be associated with a particular composite content based at least in part on the association of the particular parameters to the corresponding drop-in content.

It will also be appreciated that in some example embodiments of method 400, the drop-in content that is composited with the template content may itself include one or more color blocks and/or pixel patterns that may indicate incorporation of further drop-in content. As a non-limiting example, a drop-in content that has been incorporated by replacing a particular color block of a template content may have a color block that is to be replaced with another drop-in content. In this way, example embodiments may enable any number of nested and/or hierarchical drop-in content. The nested drop-in content may be selected in a similar manner as the first level drop-in content for incorporation.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
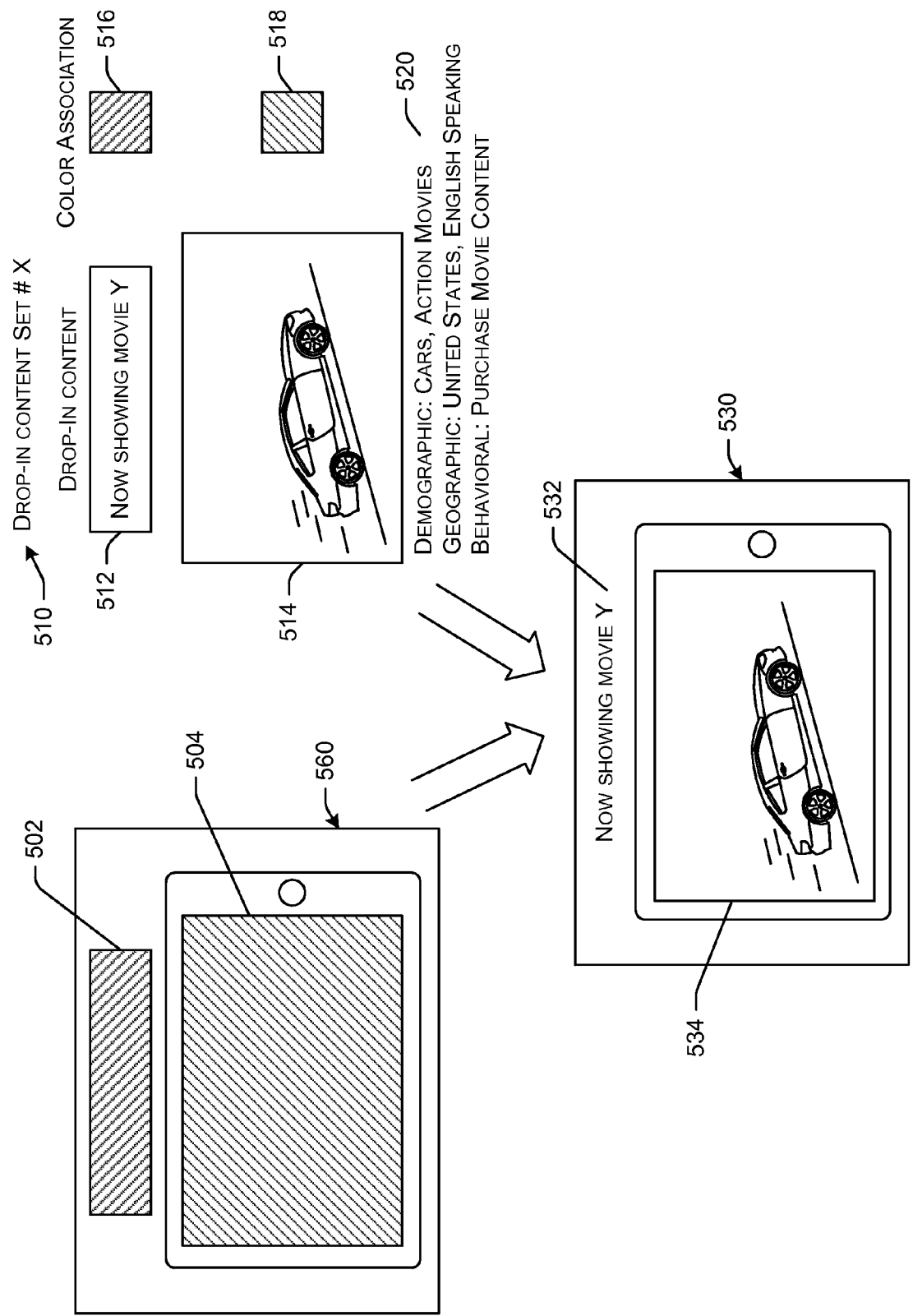
FIG. 5 illustrates a schematic representation of the method depicted in FIG. 4 for generating composite ad content, in accordance with example embodiments of the disclosure.

FIG. 5 illustrates a schematic representation of the method 400 depicted in FIG. 4 for generating composite ad content, in accordance with example embodiments of the disclosure. As shown, a template content 500 may be received from the ad buyer 110, the ad buyer server 240, or any other suitable entity. The template content 500 may have one or more color blocks (e.g., chroma-keys) 502, 504. The color of color block 502 may be different from the color of color block 504. The temporal and/or spatial range of each of the color blocks within the template content 500 may be determined by the systems and processes described above. Furthermore, a drop-in content set 510 may be selected from one or more drop-in content sets for generating a composite content 530. The drop-in content set 510 may provide a first drop-in content 512 associated with a first color 516 that is the color of the color block 502 and a second drop-in content 514 associated with a second color 518 that is the color of the color block 504. Furthermore, demographic, geographic, and behavioral parameters associated with the drop-in content set 510 may be identified. The composite content 530 may be generated by replacing the color block 502 with drop-in content 512 and the color block 504 with drop-in content 534, in accordance with the mapping of drop-in content set 510. In example embodiments, the composite content 530 may be associated with the parameters 520.

Figure 6:
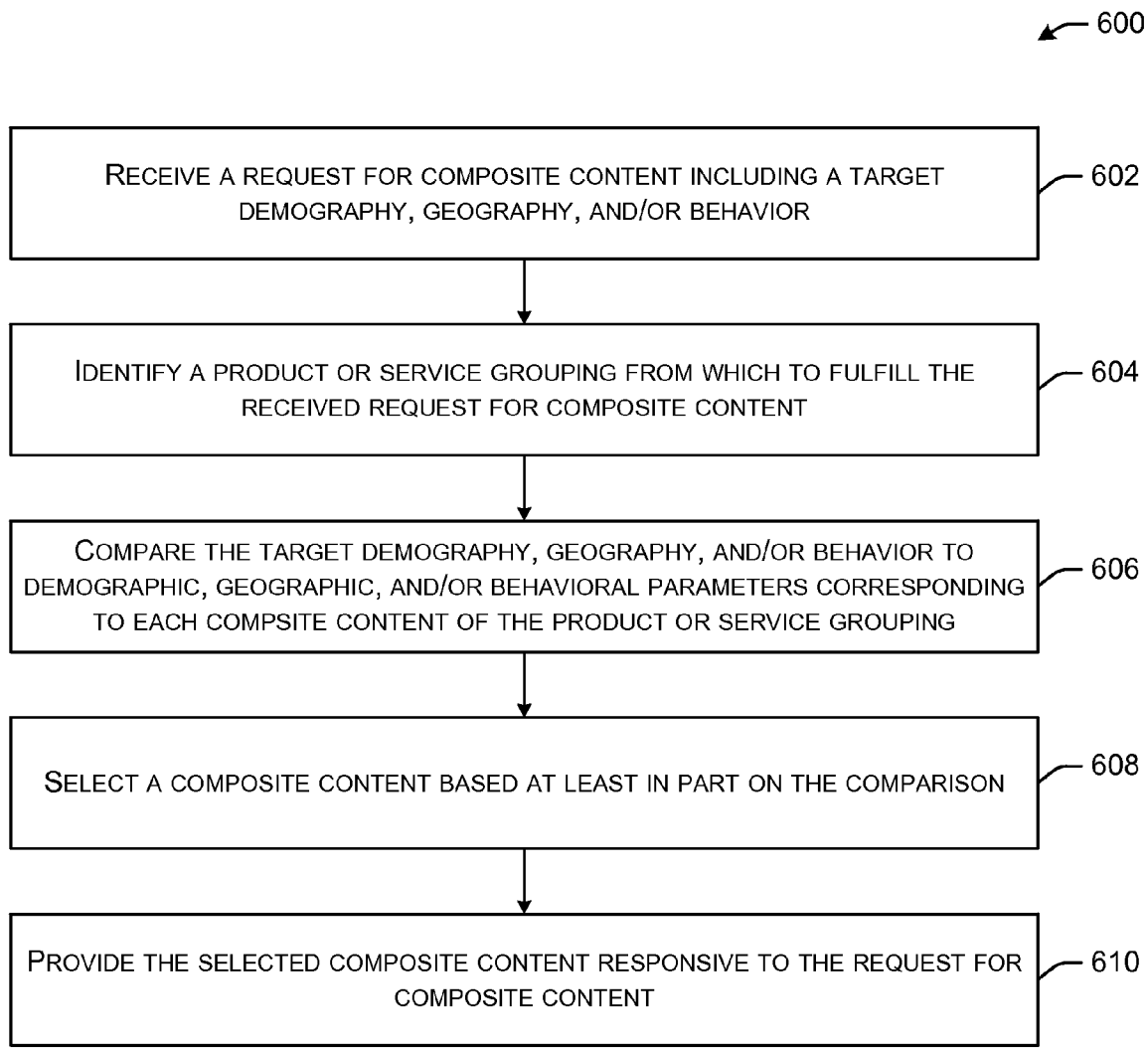
FIG. 6 illustrates a flow diagram of an example method for selecting and providing composite ad content generated by the method depicted in FIG. 4, in accordance with example embodiments of the disclosure.

FIG. 6 illustrates a flow diagram of an example method 600 for selecting and providing composite ad content generated by the method depicted in FIG. 4, in accordance with example embodiments of the disclosure. The method 600 may be performed, in example embodiments, by the compositing server(s) 260 and the processors 300 thereon. In example embodiments, the compositing server(s) 260 may cooperate with other entities, such as ad campaign server(s) 250, merchant server(s) 220, and/or content delivery server(s) 230 of environment 200 to perform method 600.

At block 602, a request for composite content including a target demography, geography, and/or behavior may be received. In example embodiments, this request for composite content may be received from one or more of ad campaign server(s) 250, merchant server(s) 220, and/or content delivery server(s) 230. Alternatively, the request for composite content may include an identification of the user 180. In cases, where the user 180 is identified in the request for composite content, but not target parameters, one or more datastores accessed to identify one or more target parameters of the user 180, such as demographical, geographical, and/or behavioral information associated with the user 180.

At block 604, a product or service grouping from which to fulfill the received request for composite content may be identified. In example embodiments, the product or service grouping may be one that has multiple composite ads originating from a single or a related set of template content. In further example embodiments, the request for composite content may provide an indication of a targeted ad campaign, advertiser, and/or grouping of products or services. Upon receiving the request for composite content, the group of composite content, such as composite content associated with and/or derived form a particular template content, composite content associated with a particular group of products or services, and/or composite content associated with a particular advertiser may be assessed from the received request for content. Information such as indication(s) of a targeted ad campaign, advertiser, and/or grouping of products or services may be utilized, in example embodiments, to shortlist a group of composite content.

At block 606, the target demography, geography, and/or behavior may be compared to demographic, geographic, and/or behavioral parameters corresponding to each composite content of the product or service grouping. At block 608, a composite content may be selected based at least in part on the comparison. In the comparison it may be determined how many parameters of various composite content match with the target parameters received with the request for composite content. In some cases, a pure number of matches may be considered for selecting a best match composite content to the target parameters. In alternative methods a scoring and/or weighted mechanism may be used to identify a best match composite content. At block 610, the selected composite content may be provided responsive to the request for composite content. The composite content may be transmitted to the requester of the same via the networks 270. The selected composite content, in example embodiments, may be retrieved from the content datastore 170 to transmit to the requester of the composite content.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
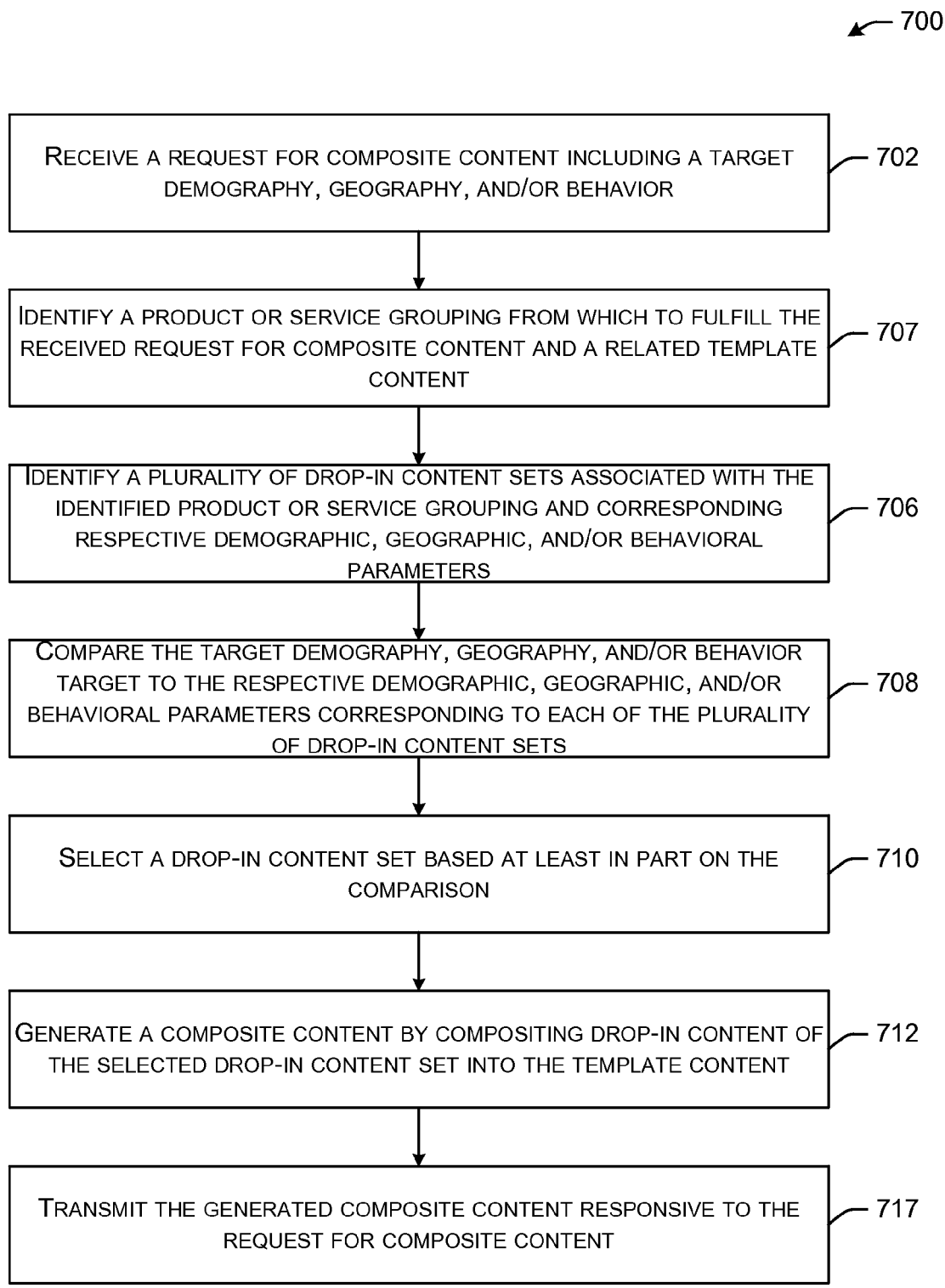
FIG. 7 illustrates a flow diagram of an example method for generating and providing composite ad content in a synchronous manner, in accordance with example embodiments of the disclosure.

FIG. 7 illustrates a flow diagram of an example method 700 for generating and providing composite ad content in a synchronous manner, in accordance with example embodiments of the disclosure. The method 700 may be performed, in example embodiments, by the compositing server(s) 260 and the processors 300 thereon. In example embodiments, the compositing server(s) 260 may cooperate with other entities of environment 200 to perform method 700.

At block 702, a request for composite content including a target demography, geography, and/or behavior may be received. In example embodiments, this request for composite content may be received from one or more of ad campaign server(s) 250, merchant server(s) 220, and/or content delivery server(s) 230. Alternatively, the request for composite content may include an identification of the user 180. In cases, where the user 180 is identified in the request for composite content, but not target parameters, one or more datastores accessed to identify one or more target parameters of the user 180, such as demographical, geographical, and/or behavioral information associated with the user 180.

At block 704, a product or service grouping from which to fulfill the received request for composite content and a related template content may be identified. In example embodiments, the product or service grouping may be one that has multiple composite ads originating from a single or a related set of template content. In further example embodiments, the request for composite content may provide an indication of a targeted ad campaign, advertiser, and/or grouping of products or services. Upon receiving the request for composite content, the group of composite content, such as composite content associated with and/or derived form a particular template content, composite content associated with a particular group of products or services, and/or composite content associated with a particular advertiser may be assessed from the received request for content.

At block 706, a plurality of drop-in content sets associated with the identified product or service grouping and corresponding respective demographic, geographic, and behavioral parameters may be identified. These parameters may be received, in example embodiments, when the sets of drop-in content are received.

At block 708, the target demography, geography, and/or behavior may be compared to the respective demographic, geographic, and/or behavioral parameters corresponding to each of the plurality of drop-in content sets. In the comparison it may be determined how many parameters of various composite content match with the target parameters received with the request for composite content. In some cases, a pure number of matches may be considered for selecting a best match composite content to the target parameters. In alternative methods a scoring and/or weighted mechanism may be used to identify a best match composite content. At block 710, a drop-in content set may be selected based at least in part on the comparison.

At block 712, a composite content may be generated by compositing the drop-in content of the selected drop-in content set into the template content. The composite content may be generated by replacing the color blocks within the template content with the corresponding drop-in content of the selected drop-in content set. The drop-in times and locations may be based on the temporal and/or spatial location of each of the color blocks. The drop-in content may be any suitable content, including text, images, video, audio, haptics, combinations thereof, or the like. In some example embodiments, a variety of image manipulation techniques may be performed to properly insert and/or replace a color block with its corresponding drop-in content. These techniques may be useful in cases where the drop-in content does not perfectly fit the color block space and/or time allocated in the template content. For example, either or both of the drop-in content or the template content may be manipulated by techniques, such as image/video filtering, image/video sharpening, modifying an image/video orientation, modifying the dithering of one or more pixels of the image/video, modifying the contrast of the image/video, modifying the brightness of the image/video, truncating pixels of the image/video, truncating frames and/or time of the video, or combinations thereof. At block 714, the generated composite content may be transmitted responsive to the request for composite content. The composite content may be transmitted to the requester of the same via the networks 270.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system, comprising:
   at least one memory that stores computer-executable instructions;
   at least one processor configured to access the at least one memory, wherein the at least one processor is configured to execute the computer-executable instructions to:
   identify a template content based at least in part on target parameters, the target parameters comprising one or more of demographic information associated with a user or geographic information associated with the user, the template content having a color block indicative of a first location for drop-in content, wherein the color block is a single color;
   determine spatial information associated with the color block, the spatial information indicating a set of pixels in the template content that correspond to the color block;

determine temporal information associated with the color block, the temporal information indicating a period of time during which the color block appears in the template content;

receive a first drop-in content set associated with the template content;

receive a second drop-in content set associated with the template content;

determine that the template content comprises a pixel pattern indicative of a second location for a third drop-in content, wherein the pixel pattern includes at least one of an image pattern, a video pattern, a quick response (QR) code, a transparent region, or a predetermined sequence of pixels;

identify a first drop-in content from the first drop-in content set based at least in part on the target parameters and a first set of parameters associated with the first drop-in content;

identify a second drop-in content from the second drop-in content set by based at least in part on the target parameters and a second set of parameters associated with the second drop-in content;

identify the third drop-in content from a third drop-in content set based at least in part on the target parameters and a third set of parameters associated with the third drop-in content;

generate a first composite content by compositing the first drop-in content with the template content by determining the first location of the color block in the template content using the spatial information and replacing the color block with the first drop-in content at a time corresponding to the temporal information and by compositing the third drop-in content with the template content by determining the second location of the pixel pattern in the template content and replacing the pixel pattern with the third drop-in content;

generate a second composite content by compositing the second drop-in content with the template content by replacing the color block with the second drop-in content;

store the first composite content in association with the first set of parameters;

store the second composite content in association with the second set of parameters;

receive a content request including the target parameters;

select, based at least in part on a comparison of the target parameters with the first set of parameters and the second set of parameters, the first composite content; and transmit the first composite content responsive to the content request.

2. The system of claim 1, wherein the at least one processor is configured to execute the computer-executable instructions to select the first composite content by comparing the target parameters to the first set of parameters and the second set of parameters to determine that there are a greater number of parameters that match between the target parameters and the first set of parameters than parameters that match between the target parameters and the second set of parameters.

3. The system of claim 1, wherein the content request is a first content request and the target parameters are first target parameters, wherein the at least one processor is configured to execute the computer-executable instructions to further:

receive a second content request including second target parameters;

determine that there are a greater number of parameters that match between the second target parameters and the second set of parameters than parameters that match between the second target parameters and the first set of parameters;

select the second composite content; and transmit the second composite content.

4. A method, comprising:

identifying, by a compositing server comprising one or more computer processors and based at least in part on target parameters, a template content, the template content having a color block indicative of a first location for drop-in content and the target parameters comprising one or more of demographic information associated with a user or geographic information associated with the user, wherein the color block is a single color;

determining, by the compositing server, spatial information associated with the color block, the spatial information indicating a set of pixels in the template content that correspond to the color block;

determining, by the compositing server, temporal information associated with the color block, the temporal information indicating a period of time during which the color block appears in the template content;

identifying, by the compositing server, a first drop-in content set associated with the template content;

identifying, by the compositing server, a second drop-in content set associated with the template content;

determining, by the compositing server, that the template content comprises a pixel pattern indicative of a second location for a third drop-in content, wherein the pixel pattern includes at least one of an image pattern, a video pattern, a quick response (QR) code, a transparent region, or a predetermined sequence of pixels;

identifying, by the compositing server, a first drop-in content from the first drop-in content set based at least in part on the target parameters and a first set of parameters associated with the first drop-in content;

identifying, by the compositing server, a second drop-in content from the second drop-in content set based at least in part on the target parameters and a second set of parameters associated with the second drop-in content;

identifying, by the compositing server, the third drop-in content from a third drop-in content set based at least in part on the target parameters and a third set of parameters associated with the third drop-in content;

generating, by the compositing server, a first composite content based at least in part on the first drop-in content and the template content by determining the first location of the color block in the template content using the spatial information and replacing the color block with the first drop-in content of the first drop-in content set at a time corresponding to the temporal information and by compositing the third drop-in content with the template content by determining the second location of the pixel pattern in the template content and replacing the pixel pattern with the third drop-in content;

generating, by the compositing server, a second composite content based at least in part on the second drop-in content and the template content by replacing the color block with the second drop-in content of the second drop-in content set;

associating, by the compositing server, the first composite content with the first set of parameters;

associating, by the compositing server, the second composite content with the second set of parameters;
receiving, by the compositing server, a content request including the target parameters; and
transmitting, by the compositing server, the first composite content.

5. The method of claim 4, wherein associating the first composite content with the first set of parameters comprises storing in a content datastore, by the compositing server, the first composite content in association with the first set of parameters, and wherein associating the second composite content with the second set of parameters comprises storing in the content datastore, by the compositing server, the second composite content in association with the second set of parameters.

6. The method of claim 4, wherein the color block is a first color block, and wherein generating the first composite content further comprises:
identifying, by the compositing server, a second color block of the template content;
identifying, by the compositing server, that a second drop-in content of the first drop-in content set corresponds to the second color block; and
replacing, by the compositing server and based at least in part on identifying that the second drop-in content of the first drop-in content set corresponds to the second color block, the second color block of the template content with the second drop-in content of the first drop-in content set.

7. The method of claim 4, wherein the color block is a first color block, and wherein generating the first composite content further comprises:
identifying, by the compositing server, a second color block within the first drop-in content; and
replacing, by the compositing servers, the second color block within the first drop-in content with a third drop-in content.

8. The method of claim 4, further comprising:
selecting, by the compositing server and based at least in part on a comparison of the target parameters with the first set of parameters and the second set of parameters, the first composite content.

9. The method of claim 8, wherein selecting the first composite content comprises comparing the target parameters to the first set of parameters and the second set of parameters to determine that there are a greater number of parameters that match between the target parameters and the first set of parameters than parameters that match between the target parameters and the second set of parameters.

10. At least one non-transitory computer-readable medium comprising computer-executable instructions that, when executed by one or more processors, executes a method comprising:
identifying, based at least in part on target parameters, a template content, the template content having a color block indicative of a first location for a first drop-in content and the target parameters comprising one or more of demographic information associated with a user or geographic information associated with the user, wherein the color block is a single color;
determining spatial information associated with the color block, the spatial information indicating a set of pixels in the template content that correspond to the color block;
determining temporal information associated with the color block, the temporal information indicating a period of time during which the color block appears in the template content;
determining that the template content comprises a pixel pattern indicative of a second location for a second drop-in content, wherein the pixel pattern includes at least one of an image pattern, a video pattern, a quick response (QR) code, a transparent region, or a predetermined sequence of pixels;
identifying a first drop-in content set associated with the template content and respective parameters corresponding to each of the drop-in content of the first drop-in content set;
selecting, based at least in part on the target parameters and the respective parameters corresponding to each of the drop-in content of the first drop-in content set, the first drop-in content from the first drop-in content set, wherein the first drop-in content is associated with a first set of parameters;
identifying the second drop-in content from a second drop-in content set based at least in part on the target parameters and a second set of parameters associated with the second drop-in content;
generating, based at least in part on the first drop-in content and the template content, a first composite content by determining the first location of the color block in the template content using the spatial information and replacing the color block with the first drop-in content from the first drop-in content set at a time corresponding to the temporal information and compositing the second drop-in content with the template content by determining the second location of the pixel pattern in the template content and replacing the pixel pattern with the second drop-in content;
receiving a content request including the target parameters;
selecting the first composite content based at least in part on the target parameters and the first set of parameters; and
transmitting the first composite content.

11. The at least one non-transitory computer-readable medium of claim 10, wherein the color block is a first color block, and wherein generating the first composite content further comprises:
identifying a second color block of the template content;
identifying that a second drop-in content of the first drop-in content set corresponds to the second color block; and
replacing, based at least in part on identifying that the second drop-in content of the first drop-in content set corresponds to the second color block, the second color block of the template content with the second drop-in content of the first drop-in content set.

12. The system of claim 1, wherein the content request is a first content request, the target parameters are first target parameters, and the at least one processor is configured to execute the computer-executable instruction to further:
receive a second content request including information associated with a user account;
request, based at least in part on the information associated with the user account, second target parameters;
select, based at least in part on a comparison of the second target parameters with the first set of parameters and the second set of parameters, the first composite content; and
transmit the first composite content.

13. The method of claim 4, wherein the content request is a first content request, the target parameters are first target parameters, and the method further comprises:
- receiving, by the composing server, a second content request including information associated with a user account;
- requesting, by the compositing server and based at least in part on the information associated with the user account, second target parameters;
- selecting, by the compositing server and based at least in part on a comparison of the second target parameters with the first set of parameters and the second set of parameters, the first composite content; and
- transmitting, by the compositing server, the first composite content.

14. The at least one non-transitory computer-readable medium of claim 10, wherein the content request is a first content request, the target parameters are first target parameters, and the method further comprises:
- receiving a second content request including information associated with a user account;
- requesting, based at least in part on the information associated with the user account, second target parameters;
- selecting, based at least in part on the second target parameters and the first set of parameters, the first composite content; and
- transmitting the first composite content.

* * * * *